Patented Mar. 20, 1928.

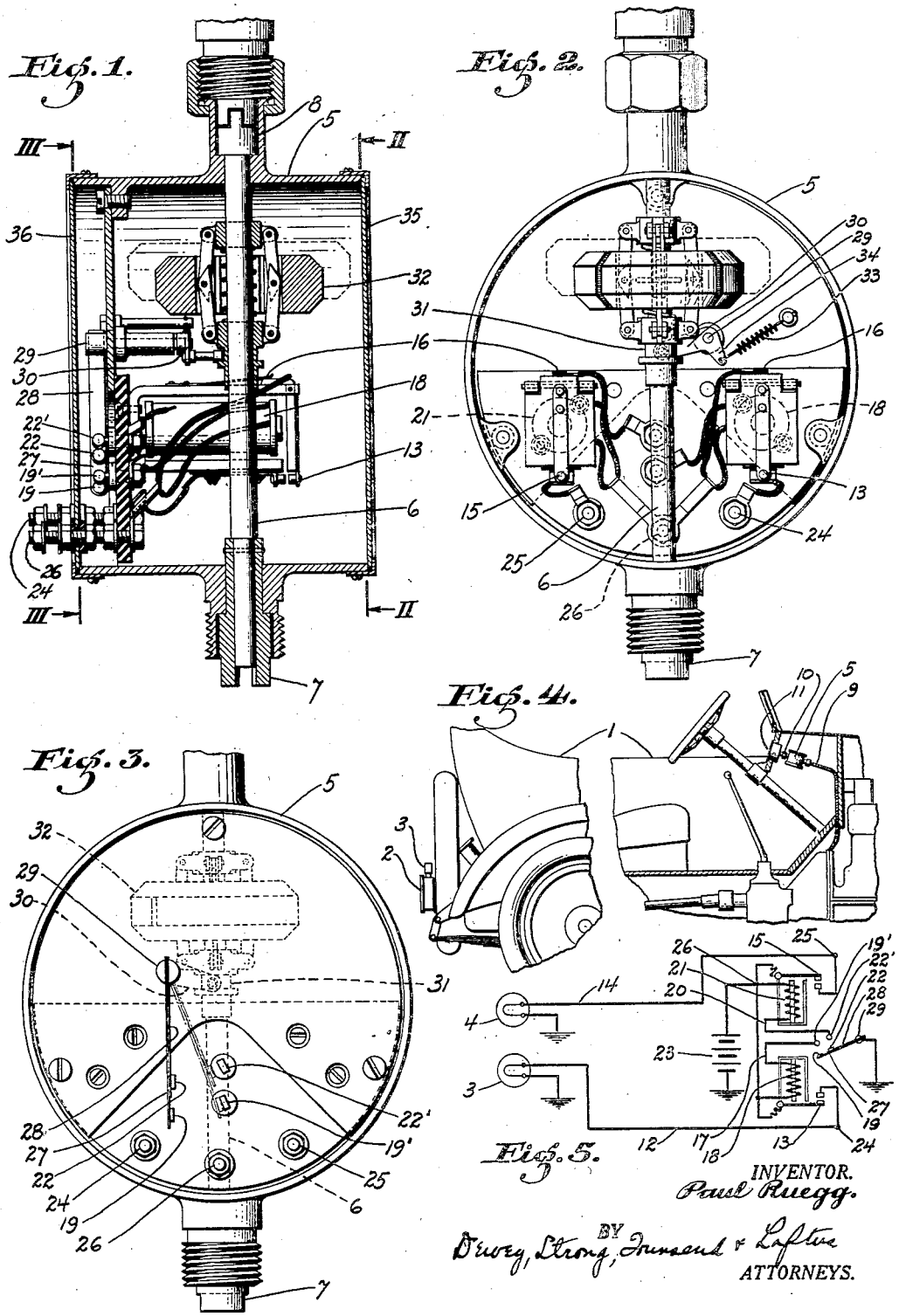

1,663,098

UNITED STATES PATENT OFFICE.

PAUL RUEGG, OF SAN FRANCISCO, CALIFORNIA, ASSIGNOR TO STEVEN A. RICE, OF SAN FRANCISCO, CALIFORNIA.

SPEED SIGNAL SWITCH.

Application filed January 18, 1926. Serial No. 82,083.

This invention relates to automatic speed signal switches and particularly to an improved governor controlled automatic switch in combination with an automobile electric light signal which automatically illuminates when the automobile reaches a predetermined speed. In a copending application of S. A. Rice, Serial Number 72,648 is defined an automobile speed indicator which is automatically illuminated from switch contacts on the speedometer. My invention herein is for an improved switch controlled mechanism for such a signal device.

Under prevailing circumstances a traffic officer can determine if an automobile is exceeding the speed limit only by trailing the automobile. This is an expensive and troublesome system and often is attended with great danger to the officer, particularly on wet or slippery streets. Furthermore, the driver of an automobile is not always aware that he is breaking the law by exceeding the speed limits even when such is the case. The object of the above stated application is to provide a mechanism, preferably operated in conjunction with the speedometer for definitely indicating to both the driver within the car and to one outside of the car, such as a traffic officer, when the car reaches or exceeds a certain predetermined speed or speeds. The primary object of my invention herein is to provide an improved and more efficient switch controlled mechanism for this purpose.

Another object of my invention is to provide a governor controlled switch adapted to be directly secured to the speedometer shaft and to operate through a relay switch to control the said electric light signals.

In the accompanying drawing I have illustrated one specific embodiment of my invention, but it will be understood that the invention can be otherwise embodied and that the drawing is not to be construed as defining or limiting the scope of the invention, the claims appended to this specification being relied upon for that purpose.

Referring to the figures of the drawing—

Fig. 1 is a sectional view through my improved switch mechanism.

Fig. 2 is a rear view thereof taken on line II—II of Fig. 1.

Fig. 3 is a front view thereof taken on line III—III of Fig. 1.

Fig. 4 is a fragmentary view of an automobile showing my invention applied thereto.

Fig. 5 is a wiring diagram of the signal controlling mechanism.

In the drawing, 1 indicates an automobile having a rear signal 2, comprising two electric lights 3 and 4, which lights are of different colors such as blue and green. The lighting of these lights is adapted to be automatically controlled by switch mechanism within a casing 5. A shaft 6 within the casing has the ends 7 and 8 thereof adapted to be directly connected to the speedometer shafts 9 and 10. In this manner the device can be quickly installed without in any way disturbing the speedometer 11 and its operation.

The circuit 12 of the light 3 is controlled by a solenoid operated switch 13, and the circuit 14 of the light 4 is controlled by a solenoid operated switch 15. These switches are normally held open by springs 16. The circuit 17 through the solenoid 18 is controlled by a contact switch 19, and the circuit 20 through the solenoid 21 is controlled by a contact switch 22. These circuits and the circuits to the lights are all connected to the battery 23 in the manner shown in Fig. 5. The binding posts 24 and 25 which are adapted to be connected to the lights 3 and 4, and the binding post 26 which is adapted to be connected to the battery, are indicated in Fig. 5.

The contacts 19 and 22 are mounted on two leaf springs 27 and 28 carried by a rotary post 29 extending into the casing. A bell crank on the inner end of this post has one arm 30 engaging in a groove in a collar 31 of a governor 32 on the shaft 6. The weight of the governor 32 and a spring 33 connected to the other arm 34 normally holds the parts in the position indicated in full lines in Fig. 3. The ends of the casing can be closed by plates 35 and 36.

The switch casing 5 is easily installed by disconnecting the speedometer shaft 9 from the speedometer 11 and mounting the casing 5 therebetween as indicated in Fig. 4. The arms of the switches 13 and 15 are normally held in the open switch position by springs 16 shown in Fig. 1. Upon rotation of the shaft 6 the governor 32 acts through centrifugal force to move upwardly to the position shown in dash lines in Figs. 1 and 2. Such movement rotates the post 29 counter-clock-wise. The extent of the upward movement of the collar 31 varies with the speed of rotation of the shaft 6. When the shaft reaches a predetermined speed the post 29 is rotated sufficiently to move the contact 19 into engagement with its cooperating contact 19'. The solenoid 18 is thereupon energized and closes the switch 13 which lights the signal lamp 3. When the shaft 6 reaches a higher predetermined speed the post 29 is rotated further and moves the contact 22 into engagement with its cooperating contact 22'. The solenoid 21 is thereupon energized and closes the switch 15 which lights the signal lamp 4.

The operation of the lamps 3 and 4 through the relays 18 and 21 serves a two-fold function. The primary switches 19 and 22 close and open very slowly and the pressure on the contacts thereof varies in accordance with the speed of the governor. Were the lamps controlled directly by these switches, the contacts would arc across and quickly burn out. Furthermore, the lighting of the lamps would not be uniform nor dependable. The switches 13 and 15, however, are closed and opened very quickly and the contacts thereof always maintain the same pressure. No substantial arcing takes place at these switches and the lamps are controlled with great reliability.

It will be obvious that my signal system is of simple construction and very easy to install. Furthermore, the same is very delicate and sure in operation and can be depended upon to very accurately operate the signal lights when the automobile reaches the speeds to which the device is set to operate. The device when installed on the car is, therefore, adapted to indicate very clearly to a traffic officer when the legal speed is being exceeded.

Having thus described my invention what I claim and desire to secure by Letters Patent is—

1. In a switch of the character described, a rocker shaft, a governor, a movable part on the governor adapted to be moved in accordance to the speed of the governor, a connection between said movable part and the rocker shaft whereby a rocking movement is imparted to the rocker shaft, a pair of leaf spring arms disposed one on top of the other and secured at one end to the rocker shaft, one of said leaf spring arms being longer than the other and each leaf spring arm having a contact member on its outer end and a pair of stationary cooperating contact members adapted to be successively engaged during the rocking movement of the rocker shaft.

2. A governor-controlled switch comprising the combination of a rotary shaft, a governor connected thereto and having a part thereof adapted to be moved in accordance to the speed of the shaft, a second rotary shaft, a pair of adjacent leaf springs secured thereto and extending outwardly therefrom, a pair of contacts respectively on the ends of the springs, a pair of co-operating contacts, and an operative connection from the said part of the governor to the second shaft, the arrangement being such that the second shaft is rotated to engage the contact on the outer spring with its co-operating contact when the first shaft reaches a pre-determined speed and is rotated to engage the contact on the inner spring with its co-operating contact when the first shaft reaches a higher pre-determined speed.

PAUL RUEGG.